United States Patent [19]
Hirsch et al.

[11] 4,151,389
[45] Apr. 24, 1979

[54] METHOD OF AND APPARATUS FOR WELDING SHEET STEEL PANELS

[75] Inventors: Peter Hirsch, Aachen-Laurenzberg; Bernhard Wübbels, Borken; Rolf Schäfer, Aachen, all of Fed. Rep. of Germany

[73] Assignee: Friedrich Eichhorn, Aachen, Fed. Rep. of Germany

[21] Appl. No.: 762,689

[22] Filed: Jan. 26, 1977

[30] Foreign Application Priority Data

Jan. 28, 1976 [DE] Fed. Rep. of Germany ....... 2603020

[51] Int. Cl.² ............................................. B23K 9/18
[52] U.S. Cl. ................................ 219/73.1; 219/137.71
[58] Field of Search ................... 219/73.1, 73.2, 73.21, 219/137.71

[56] References Cited

U.S. PATENT DOCUMENTS

| | | | |
|---|---|---|---|
| 3,172,991 | 3/1965 | Arnoldy | 219/73.2 |
| 3,518,397 | 6/1970 | Hannahs | 219/73.1 |
| 3,975,614 | 8/1976 | Toth | 219/73.1 |
| 4,000,374 | 12/1976 | DeKeysea | 219/137.71 |

Primary Examiner—Bruce A. Reynolds
Attorney, Agent, or Firm—John C. Smith, Jr.

[57] ABSTRACT

A method of and apparatus for welding sheet steel panels by submerged arc welding is described. By providing one or, depending on the thickness of the sheet steel panels, more than one pair of closely spaced wire electrodes in the weld gap with the simultaneous introduction of additional filler metal carrying no current, preferably in the form of a metal powder, disadvantages associated with known methods may be avoided.

7 Claims, 10 Drawing Figures

METHOD OF AND APPARATUS FOR WELDING SHEET STEEL PANELS

BACKGROUND OF THE INVENTION

This invention relates to a method of and an apparatus for welding sheet steel panels by the submerged arc technique.

Methods and apparatus of the contemplated kind are well known in the art. They avail themselves of one or more wire electrodes arranged in the weld gap in tandem and possibly bunched. The principal defect of such apparatus and welding machines is that they cannot carry very high currents, and that the possible welding speeds are limited accordingly. It follows that the parent metal is liable to be grossly overheated, and that the resultant weld seam tends to have unsatisfactory technological mechanical properties, particularly in the very highly heated zone adjacent the weld.

Welds are also made with the provision of additional filler metal carrying no current in the form of a plate (German Offenlegungsschrift No. 2,019,318), a wire (U.S. Pat. No. 3,816,694), and a wire grain (see Eichhorn, F., Shaheeb, A. F.: Einfluss technologischer und metallurgischer Massnahmen auf die Eigenschaften elektroschlackegeschweisster Verbindungen aus warmfester Stählen. Z. F. Werkstofftechnik 4.Jg. 1973, No. 5, pages 229–236) or metal powder (see: Eichhorn, F., Hirsch, P.: Wesentliche Steigerung der Schweissgeschwindigkeit beim Elektro-Schlacke-Schweissen bei gleichzeigiger Qualitätsverbesserung der Verbindung. DVS-Bericht Band 31, 1974, pages 37–44; Ivochkin, I. I., Sosedov, A. F.: On the effectiveness of using filler metal in powder form in electroslag welding. Svar. Proiz. 1969, H. 11, pages 18–19; Smirnov, S. A., Efmienko, L. A. et al: Special structural features and mechanical properties of electroslag welded joints made using powdered filler metal. Avt. Svarka (1973), H. 9, pages 46–50), (German Auslegeschrift No. 1,026,898, German Auslegeschrift No. 1,040,148). In these processes the supplementary metal is introduced into the pool by gravity. However, as a matter of experience the introduction of the supplementary metal is liable to be interrupted by blockage in the feed tube caused by the powerful magnetic fields that arise in the weld gap, even when the welding currents are comparatively low. The welding speed is therefore still rather low, a circumstance which entails the above-mentioned drawbacks, the additional filler metal alone being unable to bring about an improvement in the structure of the weld.

SUMMARY OF THE INVENTION

The method of welding and the apparatus proposed by the present invention have for their object the elimination of these drawbacks and the production of welds exhibiting a structure in which, among other matters, the development of coarse grain in the zone near the source of the heat is considerably less. Consequently values of notched bar toughness can be achieved, which are sufficient and necessary for achieving high load-bearing ability of the welded joint.

According to the present invention an improvement in quality of submerged arc welds is secured by a substantial increase of melting performance and of the resultant welding speed. The welding heat therefore has less time to spread with a consequent reduction of the effects of overheating of the parent metal and of the zones near the weld seam. The result is therefore a satisfactory structure of the weld and a high notched bar toughness. Microsections show that the zone of coarse graining is substantially reduced.

The higher melting performance and welding speeds are rendered possible by the provision of one or, depending on the thickness of the sheet steel panels, more than one pair of closely spaced wire electrodes in the weld gap with the simultaneous introduction of additional filler metal carrying no current, in the form of a metal powder, in quantities of up to 150% related to the quantity by weight of wire electrode consumed. This may be effected by using a controlled conveyor means in the form of flexible tubing through which an inert carrier gas blows the powder at a metered rate against the wire electrode pair or pairs from outside the weld gap closely above the surface of the metal pool. Owing to the presence of magnetic fields they function like conveyor belts and convey the metal powder into the pool. An alternative way of supplying the metal powder consists in feeding it into the metal pool in thin-walled tubes filled with the powder.

Metering and feeding means are also provided for a flux powder if this is required. However, since such a powder is not metallic, i.e. non-magnetic and normally is fed by gravity (see: Thomas, R. D.: Electroslag Welding. Welding Journal, 1960, H. 2, page 112), feeding involves no special problems.

The sliding shoes that are used in the proposed method of welding, usually made of copper, differ from conventional form of construction (German Auslegeschrift No. 1,214,813, German Auslegeschrift No. 1,096,515, German Pat. No. 1,108,352, German Offenlegungsschrift No. 1,690,673) by being longer and widening into a funnel-like configuration in the region of the metal pool. They preferably comprise a solid center part and two side portions divided across their length into sections contained and held in frame-like extensions of the center part, each section being individually movable. Moreover, the sections are also water-cooled. The sections are individually urged into contact with the surface of the sheet steel panels that are to be welded together, and they therefore improve contact on an irregular surface.

In order to facilitate and maintain control of the relative quantities of electrode material that is consumed and of the additional filler metal, as well as of any flux powder, the associated feed motors and powder conveyors are operatively interconnected. For this purpose conventional electronic control means are provided.

At higher welding speeds the maintenance of the correct welding data, including the maintenance of the correct feed rate of the additional filler metal, is more difficult. In order to ensure that quality will be maintained it is therefore essential to provide electronic control means, and this also applies to the control of the feed of flux powder.

BRIEF DESCRIPTION OF THE DRAWINGS

A preferred embodiment of welding apparatus according to the invention will now be described by way of example and with reference to the accompanying schematic drawings, in which.

DESCRIPTION OF THE PREFERRED EMBODIMENT

Figures 1, 2:
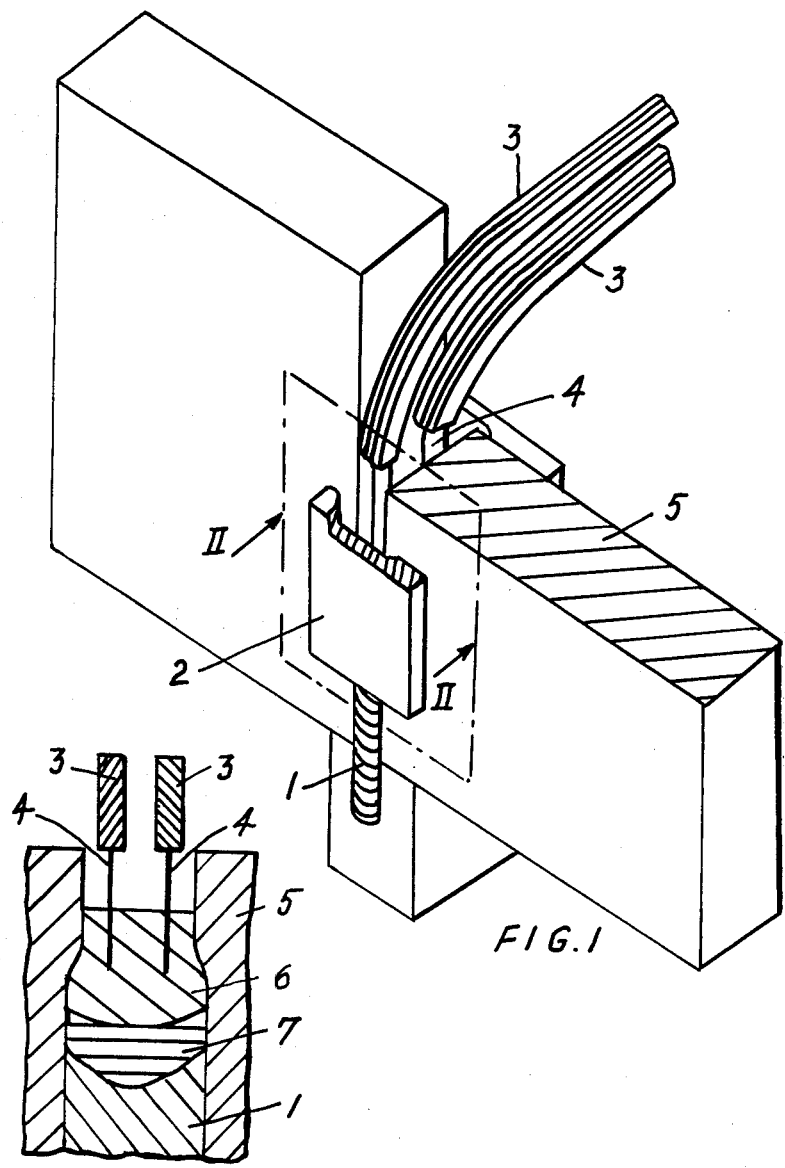
FIG. 1 is a general perspective view of the proposed apparatus.
FIG. 2 is a section taken on the line II—II of FIG. 1.

The submerged arc welding machine shown in the drawings contains two mechanically and electrically separate feed units 8 and 9 for pairs of wire electrodes 4. These are fed into the slag 6 through pairs of adjustably spaced guide tubes 3 arranged in the weld gap at a distance of about 3 to 7 mm from each other. The free ends of the wire electrodes are fused, the metal entering the weld pool 7 and freezing at 1. The holders 13 for the pairs of guide tubes 3 are likewise electrically relatively insulated, as are the power supply leads. The entire welding head is adapted to swivel as indicated at 17.

The welding current flows from a common positive terminal separately through two input resistors and copper flex conductors to the holders 13 and thence through the pairs of guide tubes 3 and wire electrodes into the slag and to the common negative terminal. If an a.c. power source is provided the arrangement of the power supply is the same, notwithstanding its alternating polarity. The current consumption of the two pairs of wire electrodes is measured by reference to the voltages developed across the two resistors and may be read on indicating instruments and corrected, in manual control, by transformer control of the speed of rotation of the wire feed motors. The welding voltages can be tapped from the guide tube holders 13 and the sheet metal panels 5, as is well understood, and read on measuring instruments. The holders 13 permit the spacing of the wire electrode pairs to be adjusted according to the thickness of the sheet metal panels.

The filler metal powder is provided by two powder feed heads 14 mounted on the machine 18 by supports 15. An inert carrier gas conveys the powder through flexible tubes outside the weld gap and ejects it towards the front or rear wire electrode pair closely above the surface of the slag 6 on the pool. The feed nozzles 11 consist of metal or ceramic material and they are connected to the power feed heads 14 by flexible tubes (not shown). They are attached to the pairs of guide tubes 3 but insulated therefrom, and their distance from and orientation to the pairs of wire electrodes are adjustable by bracket means 12. The flux powder is introduced through a nozzle 10 connected by a flexible tube to a feeder controlling its feed rate (neither being shown in the drawings). Tacho-generators coupled to the motors driving the powder feeders provide the required signals for calibrated gauges to determine the required rate of feed of the metal powder and for possibly manually correcting the same by transformer control.

Figure 3:
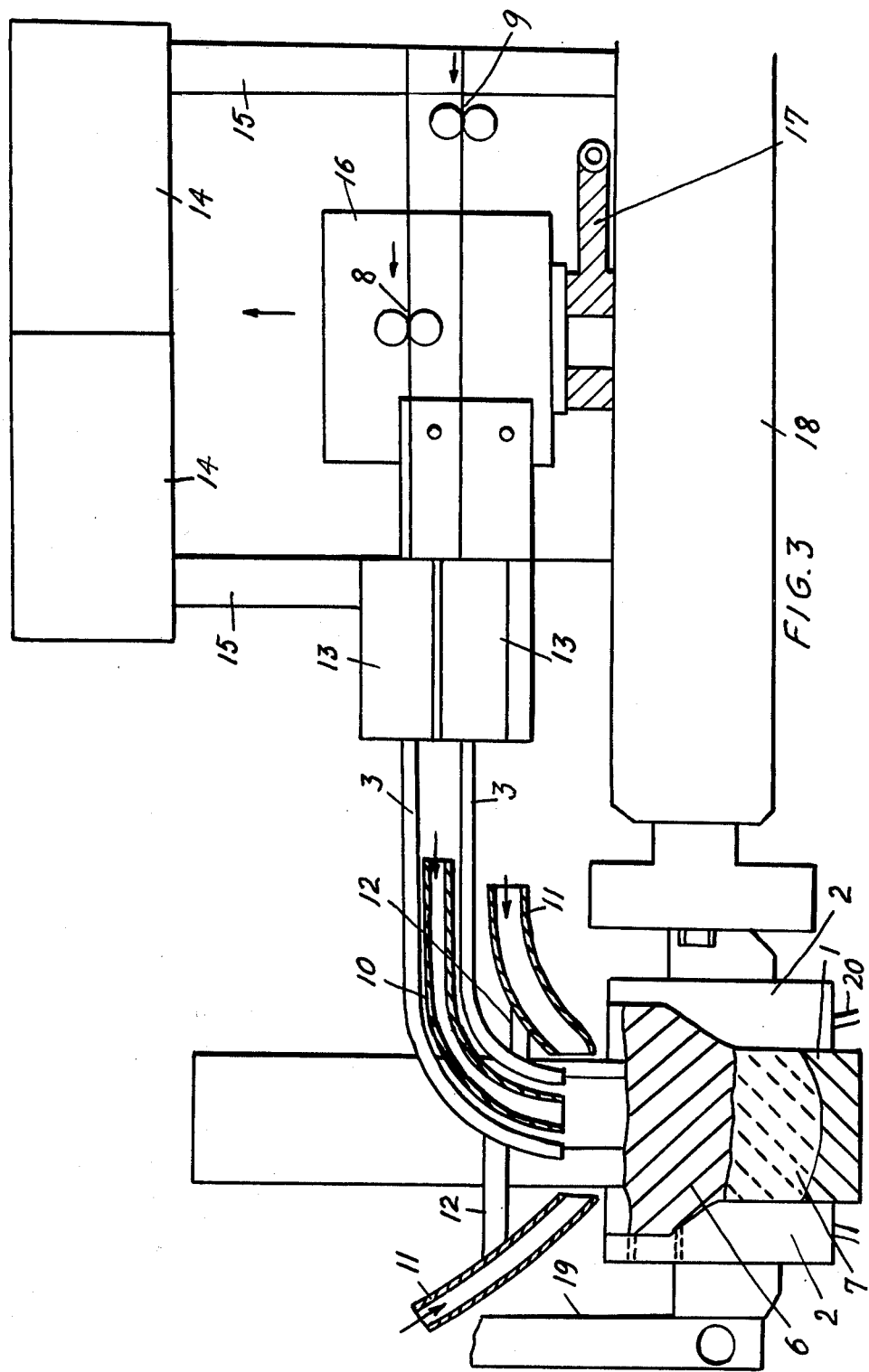
FIG. 3 is the general layout, partly in section, in the plane of the sheet metal panels that are to be welded.
Figures 4, 5, 6:
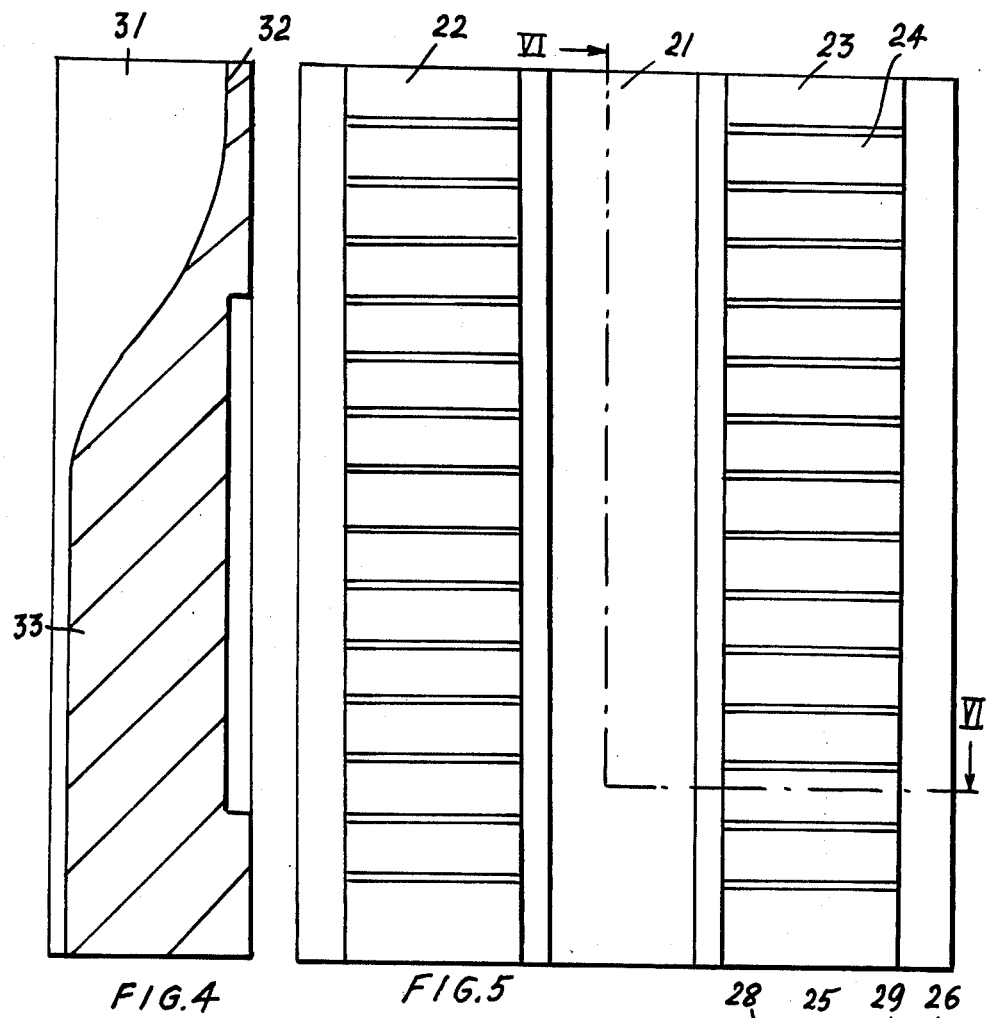
FIG. 4 is one of the sliding shoes shown in a section through the solid middle part.
FIG. 5 is a view of the sliding shoe according to FIG. 4 from the inside, i.e. the contacting side.
FIG. 6 is a section taken on the line VI—VI of FIG. 5.

For improving the stability of the welding process the sliding shoes 2 have a funnel-shaped widening 31 (FIG. 4) at the weld pool 7. The reference 32 denotes the end contour of the weld gap. In order to ensure that the sliding shoes maintain satisfactory contact with an uneven surface of the sheet metal, the shoes are divided into three parts, namely a center part 21 (32) and two side portions 22 and 23 which form frames for the reception of relatively movable sections 24 urged by springs 25 and 26 to maintain contact with the sheet metal panels that are being welded. The sections 24 are prevented from falling out of the side portions by a retaining strip 27. The center part and the sections in the side portions are provided with ducts 28, 29 and 30 and connected to lengths of hose through which cold water can be circulated for cooling. The water enters and leaves at 20 (FIG. 3).

Figure 7:
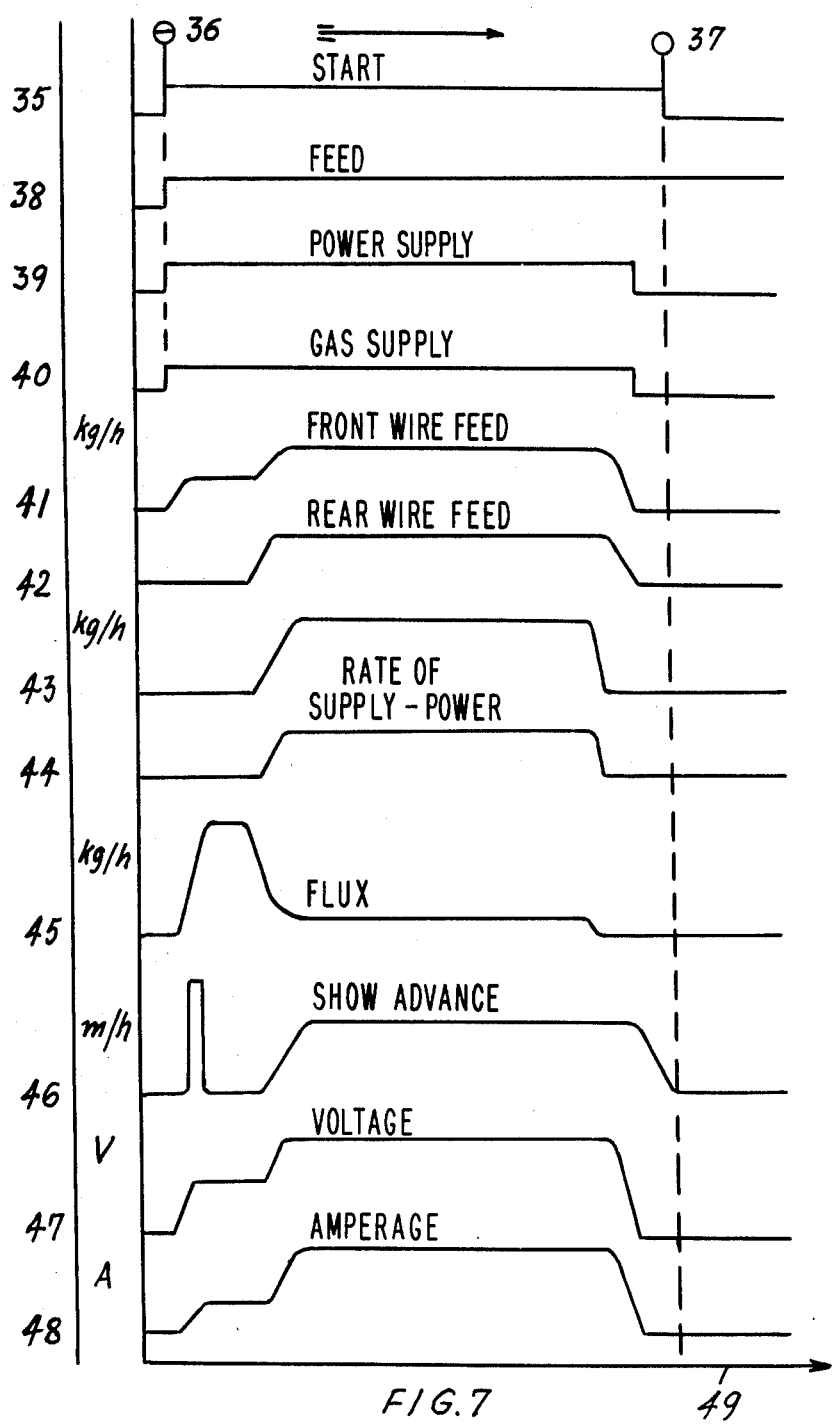
FIG. 7 are motion and control diagrams of the several phases of the welding process.
Figure 8:
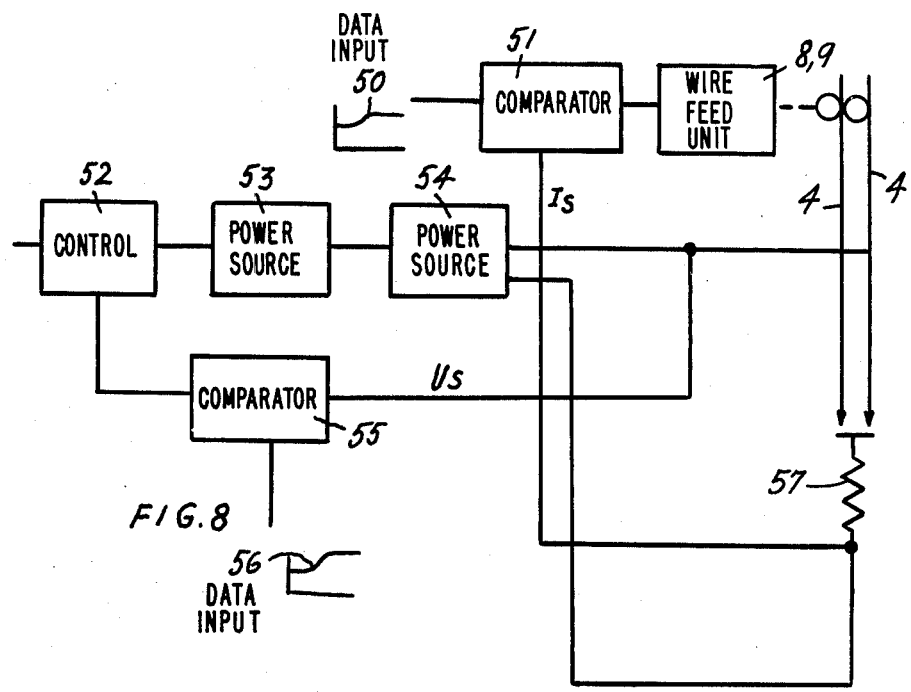
FIG. 8 illustrates the welding data input at the power source.
Figure 9:
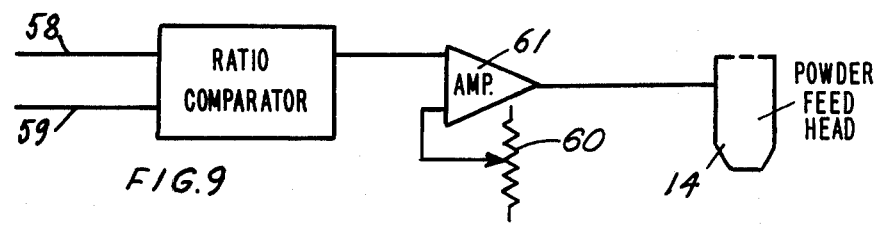
FIG. 9 shows the constant ratio control of the wire consumed and the metal powder introduced.
Figure 10:
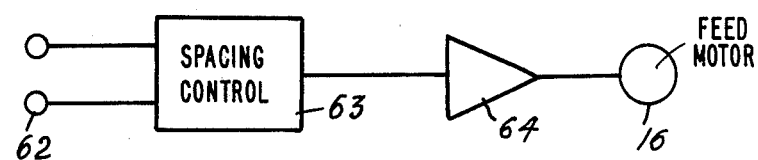
FIG. 10 is the constant spacing control between the top of the sliding shoes and the surface of the metal pool.

In order to simplify operation of the welding machine and for more accurately observing the prescribed welding data to ensure optimum quality of the weld electronic control of the following kind may be provided (FIGS. 7 to 10). FIG. 7 illustrates a process control of the individual functions and welding parameters; FIGS. 8 to 10 illustrate control circuits for individual welding parameters.

The machine is first adjustedf for starting the weld. This includes for instance locating the sliding shoes at the foot of the joint. The necessary quantity of steel chips and flux for striking the arcs is then introduced into the weld gap and the water cooling system of the sliding shoes at 38, as well as the power supply at 39 (see also 47 and 48) and the gas supply at 40 are started. The automatic electronic starting unit at 35 is switched on at 36 at the same time. In timed succession this automatically starts up the feed of the front and rear pair of wire electrodes at 41 and 42 as well as the feed unit for conveying the flux at 45 and finally the advance of the sliding shoes at 46. The first result is the production of a slag-covered bath that is between about 40 and 60 mm in depth. The manner in which this happens has been determined by preliminary tests as a function of the thickness of the panels and the automatic electronic system has been preadjusted accordingly. Not until these initial steps have been completed is a steady state welding process initiated by the gradual increase of welding current, an increase in the feed speed of the wires (FIGS. 8,9), and readjustment of the welding voltage. At the same time the rate of supply of metal powder 43 and 44 is raised to the rate which in preliminary tests has been found to be best for the thickness of the panels. The rate of supply of the metal powder is coupled with the feed rate of the wire by means of a control circuit diagrammatically illustrated in FIG. 9. The welding speed is electronically readjusted by reference to the rate at which the level of the pool rises (FIG. 10). The required measurements are made and signals generated by several vertically spaced photocells facing the center of the weld gap for sensing the level of the pool. An evaluating logic system and electronic amplification 63 produces a signal for controlling the electrode feed motor 16 at a speed at which the distance of the surface of the slag-covered pool from the upper edge of the sliding shoes remains constant.

The process of welding is stopped by a limit switch at 37 which causes first the feed of metal powder and flux powder to be discontinued and then power to be cut off and the wire and weld feed to be stopped.

FIG. 8 illustrates a system for controlling the welding voltages $U_s$ and the current $I_s$. Reference inputs 50 and 56 prescribe the required welding data. On comparison between the reference and measured values of the current 51, the measurement being made across a resistor 57, the difference signal is applied to the wire feed units 8 and 9 which correct the current deviation by varying the speed. The voltages are compared in a comparator 55 and the difference signal is used to adjust a control member 52 on the electronically controlled power source 53,54.

By comparing the quantity of metal powder supplied 58 with the weight of the wire electrode 59 (FIG. 9) consumed and a reference value for the metal powder 60 a specific ratio of metal powder to consumed weight of wire electrode weight is maintained by control of the feed head 14 for the metal powder.

Apart from the improvement in quality of the welds that is achieved as has been described, another advantage is that working times can be significantly reduced by the greater welding speeds.

The attainable welding speed is reflected in the two following tabular examples.

EXAMPLE 1

Thickness of sheet metal panel = 40 mm
$U_s$ = 51 volts
$I_s$ = 2600 amps
Melting rate = 175 kg/h
4 wire electrodes dia = 2.4 mm
Metal powder addition = 140% related to the quantity by weight of wire melted down
Width of weld gap = 26–28 mm
Free length of wire = 40 mm
Spacing of wire electrode pairs = 20 mm
Welding speed = 18 m/h

EXAMPLE 2

Thickness of sheet metal panel = 60 mm
Spacing of wire electrode pairs = 34 mm
Other data as in Example 1
Welding speed = 14m/h The invention may be embodied in other specific forms without departing from the spirit or essential characteristics thereof. The embodiment is therefore to be considered in all respects as illustrative and not restrictive.

We claim:

1. Apparatus for welding sheet steel panels by submerged arc welding comprising:
   (a) means for feeding at least one pair of wire electrodes to a weld gap between adjacent panels;
   (b) a power source arranged to feed electrical power to said electrodes;
   (c) means for feeding a filler metal powder to said weld gap;
   (d) a pair of sliding shoes at opposite sides of adjacent sheet steel panels respectively and adapted to extend across said weld gap and engage the surfaces of said panels at opposite sides of said weld gap;
   (e) means for controlling the electrical current and voltage fed to said electrodes and comprising means for receiving reference current and voltage data, comparing said current data with the actual current fed to said electrodes, regulating the speed of said wire electrode feeding means to correct any current deviation, comparing said voltage data with the actual voltage fed to said electrodes and regulating the voltage transmitted by said power source to correct any voltage deviation;
   (f) means for maintaining a predetermined ratio of metal powder to consumed wire electrodes fed to said weld gap comprising means for receiving a reference value for said metal powder, sensing and comparing the quantity of metal powder supplied to said weld gap with the quantity of wire electrode consumed at said weld gap and said reference value, and controlling said means for feeding metal powder to maintain said predetermined ratio of metal powder to consumed wire electrodes; and
   (g) means for maintaining a predetermined constant distance between the surface of the slag-covered pool formed in said weld gap and the upper edges of said sliding shoes comprising means for sensing the level of said pool and generating a signal in response thereto, and for regulating the speed of said wire electrode feeding means in response to said signal.

2. Apparatus for welding sheet steel panels as claimed in claim 1 wherein said means for feeding said wire electrodes comprises at least one pair of guide tubes spaced from each other and terminating adjacent said welding gap, said pair of wire electrodes being arranged to pass through said respective guide tubes to said weld gap.

3. Apparatus for welding sheet steel panels as claimed in claim 1 wherein said means for feeding filler metal powder comprises at least one feed nozzle terminating adjacent said weld gap for directing said filler metal powder passing therethrough to said weld gap.

4. Apparatus for welding sheet steel panels as claimed in claim 1 wherein each of said sliding shoes comprises a center portion arranged to extend along said weld gap and two side portions at opposite sides of said center portion and arranged to engage the surfaces of said panels respectively adjacent said weld gap, the surface of said center portion adjacent said weld gap having a funnel shape at the level of said slag-covered pool for determining the end contour of said weld gap, and each of said side portions comprising a frame supporting a plurality of relatively movable sections and means biasing said sections towards the surface of the respective panel to maintain close contact therewith.

5. Apparatus for welding sheet steel panels as claimed in claim 4 wherein said movable sections include ducts for circulating water for the purpose of cooling said sections.

6. Apparatus for welding sheet steel panels as claimed in claim 1 further comprising means for feeding flux powder to said welding gap.

7. A method for welding sheet steel panels by submerged arc welding, comprising:
   (a) feeding at least one pair of wire electrodes to a weld gap between adjacent panels;
   (b) feeding electrical power to said electrodes;
   (c) feeding filler metal powder to said weld gap;
   (d) applying a pair of sliding shoes across opposite sides of said weld gap respectively and to the surfaces of said sheet steel panels at opposite sides of said weld gap;
   (e) comparing the actual current fed to said electrodes with reference current data and regulating the rate at which said wire electrodes are fed to correct any current deviation;
   (f) comparing the actual voltage fed to said electrodes with reference voltage data and regulating said power fed to said electrodes to correct any voltage deviation, (g) comparing the quantity of metal powder supplied with the quantity of wire electrode consumed and a predetermined reference value for said metal powder, and controlling the feeding of metal powder to maintain a predetermined ratio of metal powder to consumed wire electrode fed to said weld gap; and (h) sensing the level of the slag-covered pool formed in the weld gap and controlling the wire electrode feeding means in response thereto to maintain a predetermined constant distance between the surface of said pool and the upper edges of said sliding shoes.

* * * * *